G. A. WILBUR.
Raising Sunken Vessels.
No. 15,586. Patented Aug. 19, 1856.
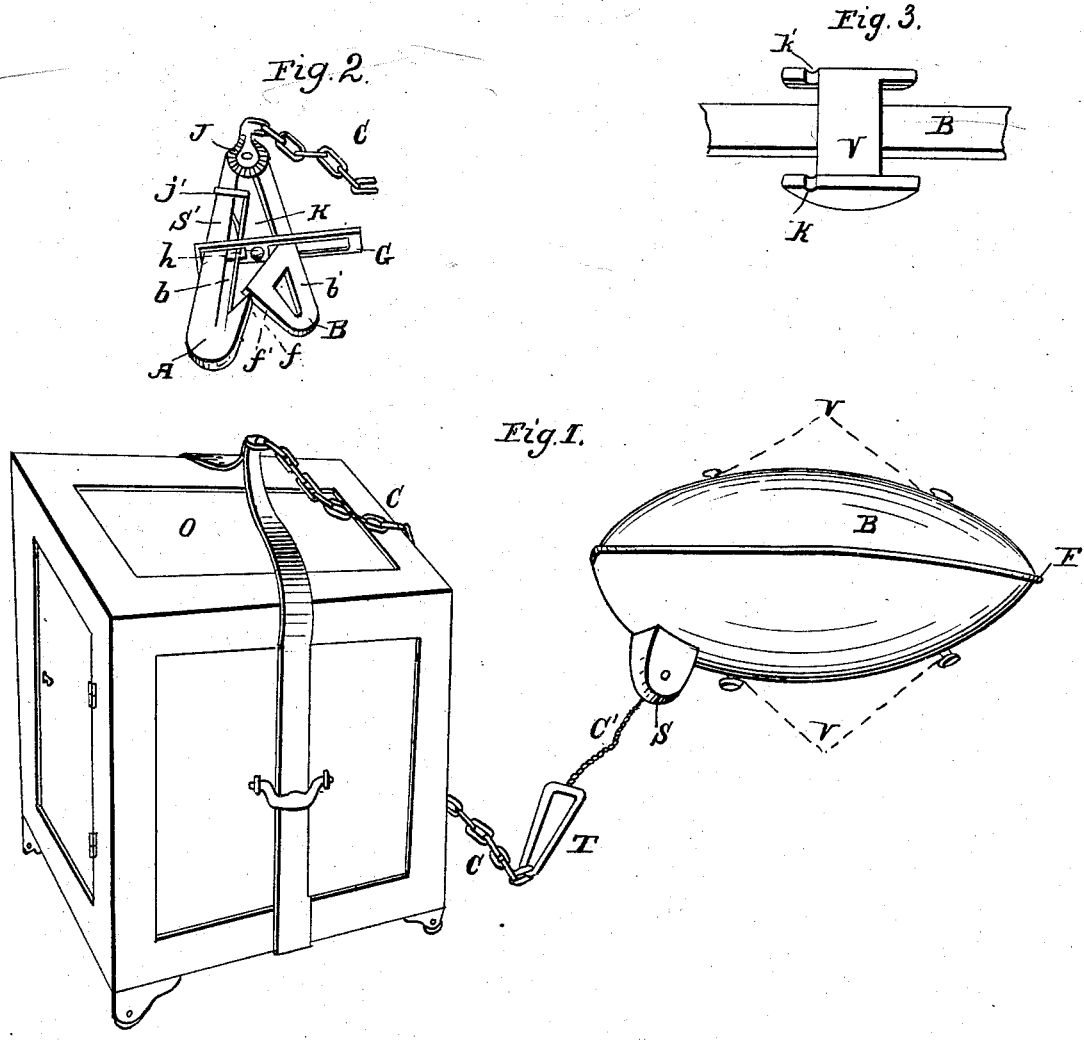

UNITED STATES PATENT OFFICE.

GREENLEAF A. WILBUR, OF SKOWHEGAN, MAINE.

GRAPPLE FOR RAISING SUNKEN BODIES.

Specification of Letters Patent No. 15,586, dated August 19, 1856.

*To all whom it may concern:*

Be it known that I, GREENLEAF A. WILBUR, of Skowhegan, in the county of Somerset and State of Maine, have invented a new and useful Improvement in Devices for Securing from Final Loss Things Liable to Sink in Water; and I do hereby declare that the following is a full, clear, and exact description of the construction and operation of the same, reference being had to the annexed drawings, making a part of this specification, in which—

Figure 1, is a perspective view of the buoy attached to a salamander safe. Fig. 2, is a perspective view of the grapple, and Fig. 3, is a view of a section of the hot-air valve.

In Fig. 1, B represents the buoy:—F, the flanges of its halves, fastened together:—V, the hot air valve:—S, the spool, upon which is wound $c'$, the buoy-chain:—O, the object to be secured:—T, the triangle or staple:—and C, the staple-chain.

In Fig. 2, A, represents one hook of the grapple, and B, represents the other:—K, the keeper:—G, the guard:—$h$, the hole in the guard:—$f$, $f'$, a furrow in the point of each hook:—C, the grapple-chain:—J, the junction of the hooks:—$s$, the spring:—and $j'$ the junction of the keeper with hook A.

In Fig. 3, V, represents the plug:—$k$, $k'$, the holes through its heads:—and B, the section of the wall of the buoy surrounding the plug.

In constructing this apparatus, the buoy (Fig. 1, B,) may be a hollow spheroid of iron, or some substance not liable to be destroyed by water or the heat of a burning ship, and may be made in two or more parts with flanges to be fastened together air-tight. The valve V, may be made by inserting a plug air-tight, through the wall of the buoy, and heading it loosely at each of its ends, the heads to be pierced with holes in the line of the body of the plug as at $k$. The plug may be composed of platinum, or any substance not so expansible from heat as the material is, of which the buoy is made, and not destructible by water. If it be wished to make the plug of a substance that will not bear heating, it may be retained in its place, by being nearly incased in the substance of the wall. A spool S, should be attached to the buoy upon which to wind the chain $c'$, and be sufficiently incased to protect it from injury, and allow of free action. The free end of chain $c'$, is to be attached to the staple T. This staple may be attached directly to the object O, or through the intervention of the staple-chain C, that the staple and buoy may be placed at a distance from O, in a situation beyond the reach of falling bodies.

The buoy should be so numbered as to indicate the length of the buoy-chain, and force necessary to raise the object O. And the buoy may be furnished with a contrivance above its water mark for persons in the water to grasp and thereby keep themselves from sinking, until aid is brought to them; thus constituting the buoy a life-preserver also.

In constructing the grapple (Fig. 2), the hook B, is attached to A, by a joint as at J.—The points of the hooks are to turn toward each other, and the point of B, extends beyond that of A, in the direction of J, and a bar runs from this point back to hook B, making $f'$ $b'$ B an acute angle. A guard G, is fastened by one end to hook A, and passes in the direction of $b'$ to beyond hook B, it has a slot near one end for the keeper K, to work in, another near the other end, for hook B, and it has a hole in a line from furrow $f$, to joint J, through which to pass the buoy-chain ($c'$, Fig. 1,):—the keeper K, is a small bar attached to hook A, by joint $j'$ its lower end kept in contact with the inside of the point of hook A, by spring S', pressing against hook A, near $j'$.

To use this apparatus, attach the staple T, to whatever it is wished to secure against loss by sinking in water, and attach the buoy, by its chain, to the staple. Let the ship, on board of which the object is placed, take fire: the heat is applied to the buoy at the point of one of its hot-air valves, the substance of which the buoy is made, expands away from the plug, leaving it loose, permitting the heated air to escape, and obviate bursting of the buoy. The ship sinks: the buoy strikes the water: the valve or valves, that are down, cool suddenly, the substance of which the buoy is composed, immediately contracts around the plugs, and the valves are tight, while the valves above the water cool more slowly and allow cool air to rush in, preventing collapse. The buoy floats, paying out its chain from the spool, as the ship sinks to the bottom. Proceed to the spot with a grapple: attach the buoy-chain from the spool: pass its freed end through the hole formed by furrows f, f', thence through the hole h, in G, take hold of the free end of the buoy-chain, draw it straight, and let the grapple descend upon it gradually, the buoy-chain will conduct the grapple to the staple, which will pass up between the hooks until the upper side of the staple is above the point of hook A when hook B, will throw it against keeper K, now slacken the buoy-chain and haul at the grapple-chain: the keeper will be pressed back, the upper bar of staple will fall into the bend of hook A, spring S', returns the keeper to its place, and retains the staple there. Then by hauling at the grapple-chain raise the object O.

I do not claim the use of a buoy or buoy-chain to indicate the position of sunken bodies. But

What I claim as my invention, and desire to secure by Letters Patent, is—

The improved construction of the grapple to be operated with a buoy, and staple, in the manner, and for the purpose substantially as set forth in the above specification.

GREENLEAF A. WILBUR.

Witnesses:
H. BAKER,
C. S. SMITH.